Sept. 9, 1952    A. G. TAPP ET AL    2,609,767
TRANSPLANTING MACHINE

Filed July 31, 1947    3 Sheets-Sheet 1

INVENTORS
ARTHUR G. TAPP &
ERNEST T. J. TAPP
BY Young, Emery & Thompson
ATTYS.

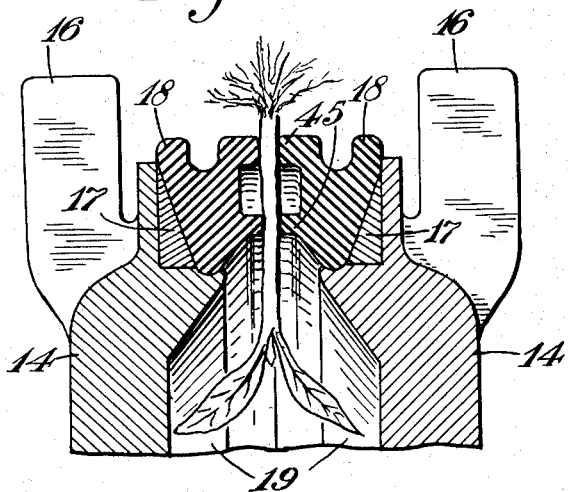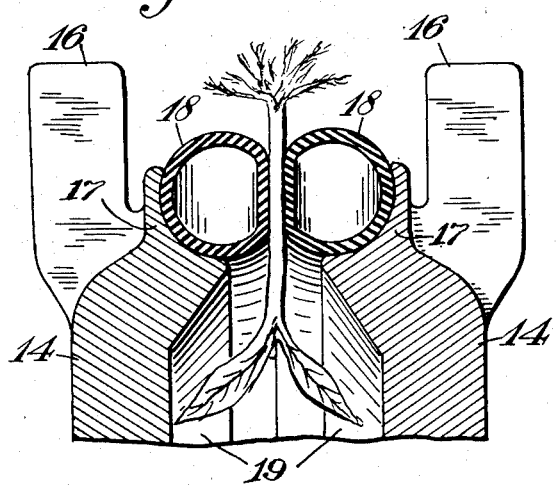

UNITED STATES PATENT OFFICE 2,609,767

TRANSPLANTING MACHINE

Arthur Griffin Tapp, St. Nicholas-at-Wade, and Ernest Thomas James Tapp, Fleet, England, assignors to County Commercial Cars Limited, Fleet, England, a British company Application July 31, 1947, Serial No. 764,980
In Great Britain May 31, 1946

Section 1, Public Law 690, August 8, 1946
Patent expires May 31, 1966

1 Claim. (Cl. 111—3)

This invention relates to agricultural machines for planting crops, particularly for transplanting seedlings, and of the kind in which the plants are separately deposited in a predetermined spaced relationship along a row. An object of the invention is to provide a simple mechanism which can be readily operated.

The word "plant" used throughout the specification is intended to be wide enough to include root crops.

The following is a more detailed description of one form of plant transplanting machine according to this invention, reference being made to the accompanying drawings, in which:

Figure 4 is an enlarged fragmentary cross-sectional view of the two forward pulleys and co-operating belts; and Figure 5 is a similar view to Figure 4 showing a different form of belt.

Figure 1:
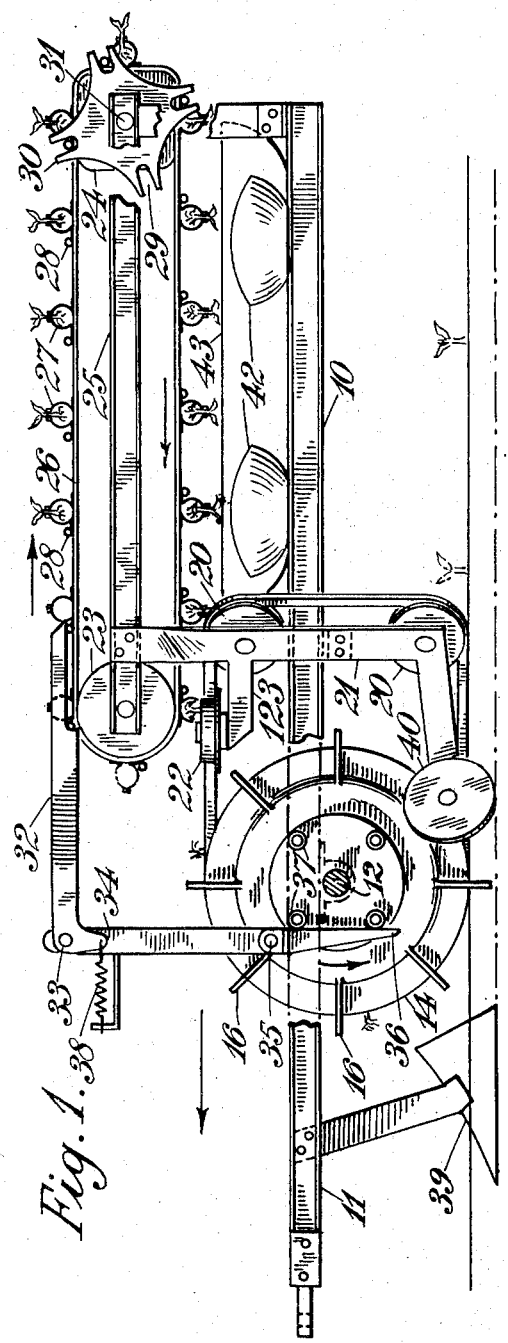
Figure 1 is a side elevation of the machine with the main supporting wheels removed and with parts of the frame broken away.
Figure 2:
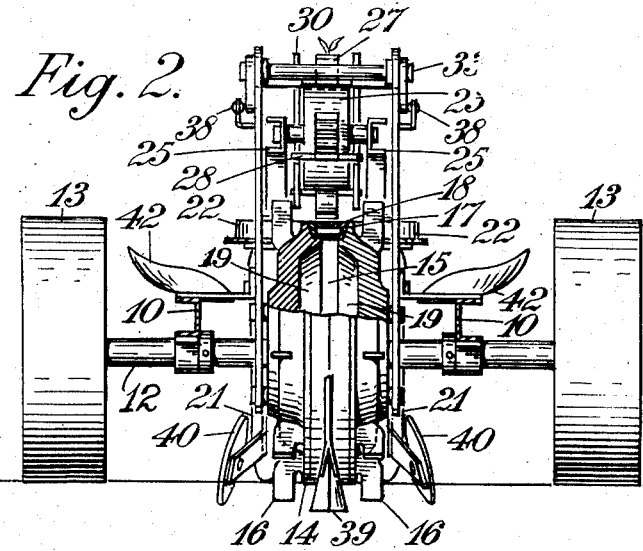
Figure 2 is a front elevation of the machine showing a part of the forward guide pulleys in section.
Figure 3:
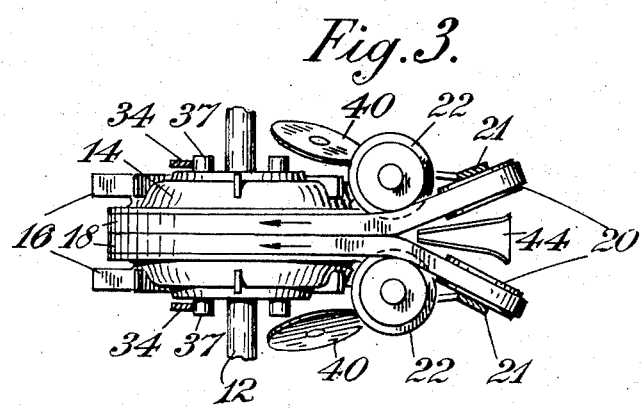
Figure 3 is a fragmentary plan view of the belts and pulleys of the plant depositing mechanism.

The main frame of the machine is indicated at 10 and comprises two longitudinal members spaced apart side by side and a forwardly-extending shaft 11 having a forward connection for attachment to a tractor. Mounted between the two longitudinal members of the frame is an axle 12 on which are mounted two land-wheels 13 (see Figure 2). Fixed also on the axle 12 are two forward pulleys 14 which are spaced apart to provide a gap 15 between them. The pulleys are preferably provided with strakes 16 which assist in driving them. The periphery of each pulley is shaped at 17 so as to support a belt 18. Adjacent faces of the pulleys are dished at 19 so as to accommodate the foliage of plants gripped between the belts. As seen from Figure 3 the belts 18, as they extend rearwardly from the pulleys 14, diverge, and each passes around two pulleys 20 disposed one above the other and so mounted on a frame member 21 that the pulleys for one belt are disposed at an angle to the pulleys for the other belt. Intermediate pulleys 22 are mounted on other frame members 123 so as to rotate about upright axes and so as to maintain the belts edge-to-edge as they pass around the forward pulleys 14. These pulleys are shown opposite one another in the drawing, but are preferably arranged in staggered relationship so as to avoid the possibility of the plant being crushed when opposite them. The frame 10 also carries mechanical means for feeding plants one by one between the converging part of the belt 18, which feeding means forms the subject of application No. 14,450/47. It comprises a circular pulley 23 and a non-circular pulley 24, which is substantially square in cross-section, which pulleys are mounted on a superstructure 25 and are encircled by an endless belt or chain 26. The forward circular pulley 23 is arranged above the converging portion of the belt 18. The belt has mounted upon it a number of pairs of resilient gripping members 27 in such a manner that as the belt passes around the circular pulley, the gripping members on that part of the belt part company. The pairs of gripping members are so spaced apart on the belt and the belt so driven that each pair of gripping members, in passing around the square pulley 24, is always located on a flat face thereof. This is effected by providing each pair of gripping members with a cross-bar 28, the ends of which are arranged to engage with recesses 29 formed in sprocket wheels 30 fixed to the shaft 31 on either side of the non-circular pulley. The belt is driven step-by-step by a reciprocal pawl member 32 which is pivotally-mounted at 33 at one end of an oscillatable lever 34 pivotally mounted at 35. The other end 36 of the lever is arranged in the path of movement of a number of rollers 37 fixed to one of the pulleys 14. A spring 38 is arranged to maintain the end of the lever-arm 36 against the rollers and the pawl 32 against the cross-bar 28. The frame of the machine also carries a ploughshare 39 which opens up the ground to form a furrow in advance of the pulleys 14 and a pair of wheels 40 are provided for closing the earth over the roots of the plants when the plant has been deposited in the furrow. The frame is provided with seats 42 conveniently placed so that the operators can insert the plants, foliage uppermost, so that the gripping members with the plants then pass around the non-circular pulley and then towards the circular pulley 23 and are released as they pass around that pulley just at the time when they are opposite the converging portion of the belt 18. At this location there is provided a guide member 44 which guides the foliage between the two pulleys 14. A hopper 43 is conveniently disposed, from which the operators can gather the plants for insertion into the gripping members.

In place of the mechanical feeding means, the plants may be fed by hand between the converging portions of the belt and in order to assist in this operation either one or both the intermediate pulleys 22 may be formed as cams whereby the belts may be moved towards and away from one another in the required time relationship so that the operator may know when to insert the plants.

One suitable form of belt is shown in Figure 4 which may be formed from reinforced rubber so as to provide two laterally-extending projections 45 spaced radially apart so that the projections on one belt are arranged opposite the projections on the other and provide resilient gripping members.

In the alternative arrangement shown in Figure 5 the belts are shown as being tubular in cross-section.

We claim:

In a transplanting machine, a longitudinally extending frame adapted for forward movement over the ground, a pair of forward pulleys mounted face to face on said frame to rotate about a substantially horizontal transverse axis, upper and lower pairs of rear pulleys mounted on said frame with the pulleys of each pair arranged to rotate about substantially horizontal axes which diverge as they extend forwardly, the lowermost edges of said forward pulleys and of said lower rear pulleys being arranged adjacent the ground in the same generally horizontal plane, the uppermost edges of said forward pulleys and of said upper rear pulleys being arranged in the same general plane, a pair of endless belts each passing around a forward pulley and a lower rear pulley and an upper rear pulley to provide upper and lower stretches of belts, the pulleys of each pair being spaced apart transversely, said belts being arranged to project beyond the inner edges of said forward pulleys into contact with each other to grip plants therebetween, a pair of intermediate pulleys mounted on said frame to rotate about substantially upright axes and engaging the upper stretches of said belts to converge said belts into plant-gripping contact, and means to rotate said forward pulleys with forward movement of said frame to move said upper stretches forwardly and said lower stretches rearwardly; whereby to provide an upper point where the belts converge to receive a plant, a stretch where the belts are in contact to carry the plant around the forward pulleys, and a point near the ground where the belts diverge to release the plant.

ARTHUR GRIFFIN TAPP.
ERNEST THOMAS JAMES TAPP.

REFERENCES CITED

The following references are of record in the file of this patent:

UNITED STATES PATENTS

| Number | Name | Date |
|---|---|---|
| 92,961 | Holbert | July 27, 1869 |
| 1,215,125 | Davis | Feb. 6, 1917 |
| 1,322,389 | Wyckoff | Nov. 18, 1919 |
| 1,368,486 | Chaney | Feb. 15, 1921 |
| 1,453,923 | DeYoung | May 1, 1923 |
| 1,802,273 | Richards et al. | Apr. 21, 1931 |
| 2,145,771 | McCartney | Jan. 31, 1939 |

FOREIGN PATENTS

| Number | Country | Date |
|---|---|---|
| 434,035 | Germany | Sept. 17, 1926 |
| 627,325 | Great Britain | Aug. 8, 1949 |
| 635,743 | France | Jan. 2, 1928 |